March 31, 1964
B. F. GILBREATH ETAL
SHUNT MOTOR CONTROL CIRCUIT FOR SPEED
REGULATION AND CURRENT LIMITING
Filed Aug. 13, 1962
3,127,550
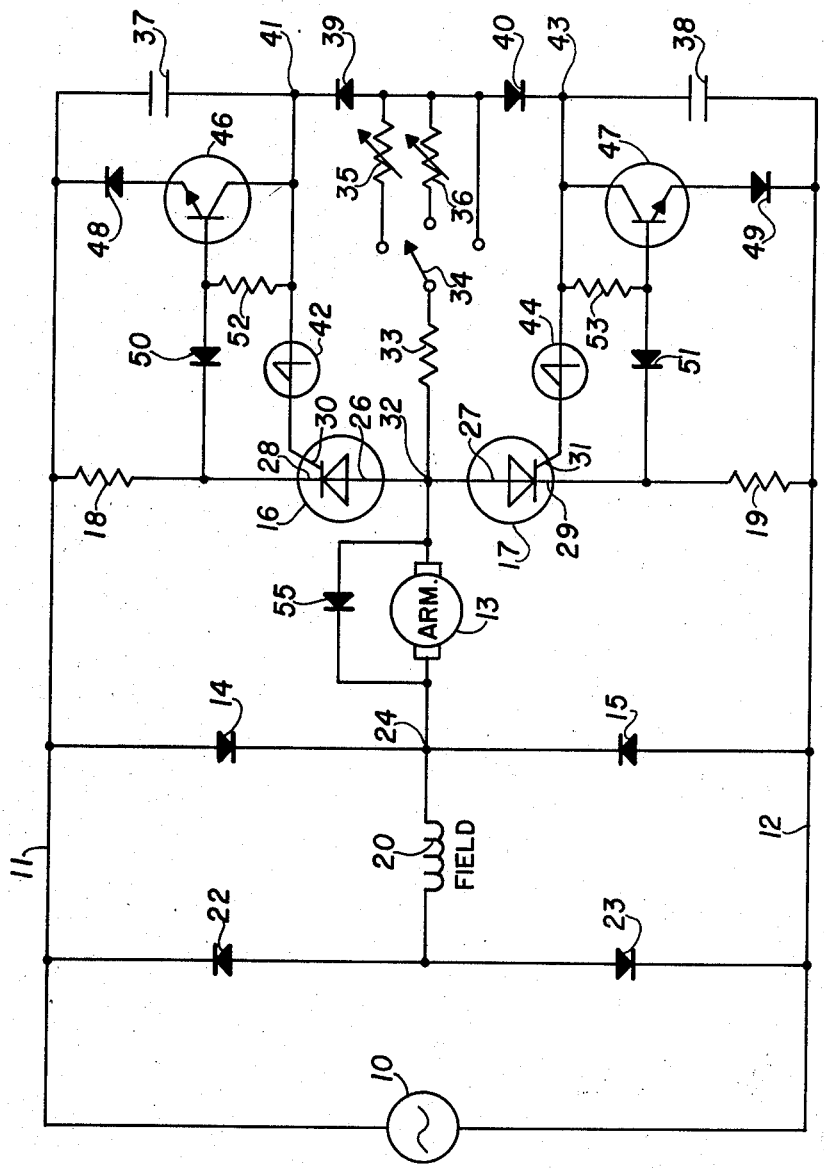
BENJAMIN F GILBREATH
JULIAN G. GONZALEZ, JR.
RUSSELL W. JONES
INVENTORS
BY *John A. Graham*
ATTORNEY 3,127,550
SHUNT MOTOR CONTROL CIRCUIT FOR SPEED
REGULATION AND CURRENT LIMITING
Benjamin F. Gilbreath, Richardson, Julian G. Gonzalez, Jr., Garland, and Russell W. Jones, Dallas, Tex., assignors to Texas Instruments Incorporated, Dallas, Tex., a corporation of Delaware
Filed Aug. 13, 1962, Ser. No. 216,672
8 Claims. (Cl. 318—331)

This invention relates to controlled rectifier circuits for supplying direct current to a load from an alternating current source, and more particularly to circuits for controlling the speed of D.C. shunt motors.

Due to its variable speed characteristics, a D.C. shunt motor would be well suited for use in home appliances, particularly if a commercially suitable control circuit was available which used reliable solid-state components such as semiconductor controlled rectifiers. However, the control circuits using SCR's heretofore developed for shunt motors are rather elaborate in that many components are necessary, and the firing circuits for the SCR's use relatively large components, such as transformers and saturable reactors, which are not readily adapted for modular or integrated circuit fabrication techniques. Also, for appliance applications, it is necessary to provide a simple mechanism for limiting the current through the motor armature under heavy load or locked motor conditions.

It is therefore the principal object of this invention to provide a firing circuit for controlled rectifiers in a shunt motor supply which is suitable for construction in integrated circuit form. An additional object is to provide improved firing circuits for controlled rectifiers utilized in shunt motor circuits. Another object is to provide an improved supply circuit for a D.C. shunt motor utilizing PNPN controlled rectifiers. A further object is to provide a small, light-weight and inexpensive D.C. shunt motor control circuit adapted for maintaining a wide range of selected speeds regardless of load conditions and for preventing excessive armature current under loaded-motor conditions.

In accordance with an illustrative embodiment of this invention, two bridge rectifiers having a pair of common diodes are connected across an A.C. source, with the armature of a D.C. motor connected in one bridge and the shunt field in the other. A pair of PNPN controlled rectifiers is used in the bridge which includes the armature, the firing angles of these rectifiers being controlled in response to the selected and actual motor speeds. Of course, other supply circuits would be suitable, the basic feature of this invention being the firing arrangement. In the illustrated embodiment, the firing circuit includes a trigger diode and a resistance-capacitance arrangement for the gate of each controlled rectifier, with the capacitor being charged in relation to the armature voltage, thus providing feed-back related to motor speed. A current limiting feature is provided by a unique feed-back arrangement shunting each of the RC circuits.

The novel features believed to be characteristic of this invention are set forth in the appended claims. The invention itself, however, along with further objects and advantages thereof, may be best understood by reference to the following detailed description of an illustrative embodiment, when read in conjunction with the accompanying drawing, wherein:

The single figure is a schematic diagram of a shunt motor control circuit incorporating the principal features of this invention.

With reference to the figure, a D.C. shunt motor control circuit is shown which has the motor armature connected in one rectifier bridge and the motor field in another rectifier bridge and which utilizes a triggering or firing circuit in accordance with this invention. An alternating source 10 is connected across a pair of supply lines 11 and 12, and an armature 13 of a D.C. shunt motor is connected to the lines 11 and 12 by a full-wave bridge rectifier including a pair of diodes 14 and 15 along with a pair of controlled rectifiers 16 and 17, the latter being serially connected with current-sensing resistors 18 and 19. A field winding for the shunt motor is likewise connected to the lines 11 and 12 by a full-wave bridge rectifier including a pair of diodes 22 and 23 along with the diodes 14 and 15. These diodes 14 and 15 are thus common to the bridge rectifiers, with a juncture 24 between the diodes forming a positive terminal for both the field and the armature. Although this supply arrangement for the field is convenient in that it saves a pair of diodes, obviously other field supply arrangements could be used with this invention.

With the arrangement thus far described, it is seen that the field 20 will be supplied with full-wave pulsating direct current at a substantially constant R.M.S. value. Direct current will flow in the armature 13 to the extent that the controlled rectifiers 16 and 17 are conductive, which will of course be determined by the triggering arrangement as subsequently described.

The controlled rectifiers 16 and 17 include anodes 26 and 27, cathodes 28 and 29 and gates 30 and 31, respectively. The voltage on the anodes 26 and 27, or at a junction 32, with respect to the potential at the junction 24, will always be equal to the voltage across the armature, including back E.M.F. and IR drop. This voltage at the junction 32 is used to supply the firing circuits for the gates 30 and 31. The firing circuits are basically trigger diodes connected to capacitors which are charged by means of a variable resistance arrangement including a series resistor 33, a three-position switch 34, and a pair of resistors 35 and 36. The common terminal of the resistors 35 and 36 is connected to separate capacitors 37 and 38 through series diodes 39 and 40, respectively. The charging circuit for the capacitor 37 is thus seen to include the diode 15, the armature 13, the junction 32, the resistor 33 along with one of the resistors 36 or 35 (depending upon the position of switch 34), the diode 39 and the capacitor 37. In like manner, the capacitor 38 charges through the diode 14, the armature, the resistance means, and the series diode 40. One side of the capacitor 37, at a junction 41, is connected through a trigger diode 42 to the gate 30, while one side of the capacitor 38 is connected from a junction 43 through a like trigger diode 44 to the gate 31. The control rectifier 16 will fire when the line 12 is positive with respect to the line 11 and the capacitor 37 has charged to a potential equal to the breakdown voltage of the trigger diode 42, the capacitor at this time providing a gate-cathode current pulse. In like manner, the control rectifier 17 will fire when the line 11 is positive with respect to the line 12 and the capacitor 38 is charged to its associated trigger diode breakdown voltage. It should be noted that the trigger diodes 42 and 44 do not exhibit zero forward voltage drop after breakdown, but instead have a down voltage only several volts lower than their breakdown potential. Assuming that the breakdown voltage of the diodes 42 and 44 is 32 volts, the down voltage may be 28 volts. The capacitors 37 and 38 then would not discharge below 28 volts, absent the current limiting function described later. The range over which the capacitors charge and discharge would thus be only four volts.

The charging rate of the capacitors 37 and 38 is determined by the position of the switch 34 and/or the setting of the potentiometers 35 and 36. Also, the charging rate is determined by the drop across the armature 13, since the positive potential at the point 32 will be reduced from the supply or A.C. input potential by this drop. With the switch 34 in the upper position, a relatively high resistance will be in series with the capacitor charging circuits. It will take a relatively longer time for the capacitors 37 and 38 to build up to the firing potentials, and so the controlled rectifiers will be fired relatively late in each half cycle. For a given load on the motor, this would establish a certain nominal motor speed. If the motor speed was higher, the armature voltage drop would be high and thus tend to retard firing, reduce motor armature current and slow down the motor. On the other hand, if the motor speed was low, the armature voltage would be low, the capacitors would charge to the trigger diode breakdown earlier, the controlled rectifiers would fire earlier, and the motor would speed up. If the resistance in the charging paths of the capacitors is changed by switching to the middle or lower positions of the switch 34, the nominal speed of the motor would increase since the capacitors would charge faster and the SCR's would fire earlier.

As the load on the motor increases, the control arrangement for firing the SCR's of course tends to maintain the motor speed constant, and this would require an increase in the motor armature current. In order to prevent the armature current from exceeding the rated values of the various components in the armature circuit, the control system of this invention includes a current limiting feature. This is provided by a pair of transistors 46 and 47 which shunt the capacitors 37 and 38, respectively. The emitters of the transistors 46 and 47 are serially connected with diodes 48 and 49 which, along with the base-emitter P-N junctions, prevent the transistors from being turned on until a base voltage of about a volt is applied. The bases of these transistors are connected to the current-sensing resistors 18 and 19 through diodes 50 and 51, respectively. The base biasing arrangement for these transistors is completed by a pair of resistors 52 and 53. In operation, the transistor 46 would normally be maintained cut-off since the effective base-emitter voltage would be approximately equal to the drop across the resistor 18 which is selected to be less than about one-half volt for ordinary armature currents, this being insufficient to cut-on the transistor. As the armature current increases, however, the drop across the resistor 18 increases to a point where the base-emitter voltage is adequate to turn on the transistor 46. Of course, if the voltage across the resistor 18 reached a sufficiently high level, the diode 50 would be back biased and the transistor 46 would be rendered conductive by base bias current through the resistor 52. When the armature 46 is turned on, it provides a low impedance shunt across the capacitor 37, allowing it to discharge during each cycle to a potential lower than the 28 volt down voltage of the diode 42. On the next cycle, the capacitor must charge up to the 32 volt breakdown level. Thus, the firing angle of the SCR 16 will be retarded due to the longer charging time for the capacitor 37. The current limiting circuit associated with the capacitor 38 would of course operate in the same manner.

Although the particular values of the components utilized in the circuit described above would depend upon the application, an example of a practical embodiment of this circuit may use the following:

| | | |
|---|---|---|
| Source 10 | volts A.C. | 110 |
| Diodes 14, 15 | | 1N1616 |
| Diodes 22, 23, 39, 40 | | 1N649 |
| Diodes 48, 49, 50, 51 | | TI 54 |
| Trigger diodes 42, 44 | | TI 42 |
| Controlled rectifiers 16, 17 | | 2N688 |
| Transistors 46, 47 | | 2N335 |
| Capacitors 37, 38 | μf | 0.47 |
| Resistors 18, 19 | ohms | 0.1 |
| Resistor 33 | do | 3.3K |
| Resistors 52, 53 | do | 100K |
| Potentiometer 35 | do | 30K |
| Potentiometer 36 | do | 15K |

A diode 55 shunts the armature 13 in a reverse direction to prevent the point 32 from becoming positive with respect to the junction 24, thus acting as a so-called "free-wheeling" rectifier.

Although the control circuit of this invention has been described with reference to the problem of controlling current through a shunt motor armature, this description is not meant to be construed in a limiting sense. It is, of course, understood that this circuit could be used to control current through any suitable load device, and various other modifications of the described circuit may be made by persons skilled in the art. Accordingly, it is contemplated that the appended claims will cover any such modifications that fall within the true scope of the invention.

What is claimed is:

1. In a circuit for supplying direct current to a load from an alternating current source:
   (a) a semiconductor controlled rectifier having an anode, a cathode, and a gate,
   (b) means connecting the anode and cathode of the controlled rectifier in a closed series circuit with the alternating current source and the load, the anode being adjacent the load in the closed series circuit,
   (c) a variable resistor and a capacitor connected in series in the named order between the anode and the cathode of the controlled rectifier,
   (d) a threshold trigger diode connecting a point intermediate the resistor and capacitor to the gate of the controlled rectifier, the diode having a breakdown voltage much less than the peak voltage of the source and exhibiting a high impedance until this breakdown voltage is exceeded and thereafter exhibiting a low impedance and a down voltage somewhat less than such breakdown voltage,
   (e) a transistor having its collector-emitter path shunting the capacitor so that when the transistor is conductive the capacitor will discharge to a value much less than said down voltage during alternate half cycles of the source,
   (f) and biasing means responsive to the current in the load connected to the base of the transistor effective to render the transistor conductive when the load current exceeds a preselected maximum.

2. Apparatus according to claim 1 wherein the load is the armature of a shunt motor.

3. In a circuit for supplying direct current to a load from an alternating current source:
   (a) a semiconductor controlled rectifier having an anode, a cathode and a gate,
   (b) means connecting the anode and cathode of the controlled rectifier in a closed series circuit with the alternating current source and the load, the anode being adjacent the load in the closed series circuit,
   (c) resistance means and a capacitor connected in series in the named order between the anode and cathode of the controlled rectifier,
   (d) and a trigger diode connecting a point intermediate the resistance means and capacitor to the gate of the controlled rectifier, the trigger diode having a breakdown voltage much less than the peak voltage of the source and exhibiting a high impedance until this breakdown voltage is exceeded and thereafter exhibiting a low impedance and a voltage somewhat less than such breakdown voltage.

4. Apparatus according to claim 3 wherein the load is the armature of a shunt motor.

5. In a shunt motor control circuit:
   (a) an alternating current source,
   (b) rectifying means including a controlled rectifier connecting the armature of said shunt motor in series with said source,
   (c) resistance means and a capacitor connected in series between the anode and cathode of said controlled rectifier, (d) a trigger diode connecting the juncture of said resistor and capacitor to the gate of said controlled rectifier, (e) a transistor with the emitter-collector path shunting said capacitor and means for normally biasing said transistor in a cut-off condition, (f) and means responsive to the armature current for rendering said transistor conductive to retard the firing angle of the controlled rectifier.

6. An armature current supply circuit for a shunt motor comprising:
(a) a bridge rectifier with means for supplying alternating current to first and second opposite terminals of the bridge and means for connecting the motor armature to third and fourth opposite terminals of the bridge,
(b) a pair of controlled rectifiers each having anode, cathode and gate electrodes, one of the controlled rectifiers being connected in each of the arms of the bridge adjacent said third terminal, with the anode electrodes of the controlled rectifiers being connected together,
(c) a pair of capacitors each having one terminal connected to a different one of the first and second terminals of the bridge,
(d) resistance means connecting the third terminal of the bridge to the remaining terminals of the pair of capacitors,
(e) a pair of trigger diodes each connecting said remaining terminal of a different one of the capacitors to the gate electrode of a different one of the controlled rectifiers, each trigger diode exhibiting a high impedance for applied voltage up to a breakdown voltage level and then exhibiting a low impedance after said breakdown level is exceeded, the voltage drop across the diodes being substantially in the low impedance state whereby said capacitors are not completely discharged upon firing the controlled rectifiers.

7. In a circuit for supplying direct current to a load from an alternating current source:
(a) a bridge rectifier with means for supplying alternating current from the source to first and second opposite terminals of the bridge and means for connecting the load to third and fourth opposite terminals of the bridge,
(b) a pair of semiconductor controlled rectifiers each having anode, cathode and gate electrodes, the anode-cathode path of each of the controlled rectifiers being connected in a different one of the arms of the bridge adjacent said third terminal, with the anode electrodes of the controlled rectifiers being connected together,
(c) a pair of capacitors each having one terminal connected to a different one of the first and second terminals of the bridge,
(d) resistance means connecting the third terminal of the bridge to the remaining terminals of the pair of capacitors,
(e) and a pair of threshold trigger diodes each connecting said remaining terminal of a different one of the capacitors to the gate electrode of a different one of the controlled rectifiers, each diode having a breakdown voltage much less than the peak voltage of the source and exhibiting high impedance until this breakdown is exceeded, but thereafter exhibiting a low impedance and a down voltage somewhat less than such breakdown voltage.

8. In a circuit for supplying direct current to the armature of a shunt motor from an alternating current source:
(a) a bridge rectifier with means for supplying alternating current from the source to first and second opposite terminals of the bridge and means for connecting the motor armature to third and fourth opposite terminals of the bridge,
(b) a pair of semiconductor controlled rectifiers each having anode, cathode and gate electrodes, the anode-cathode path of each of the controlled rectifiers being connected in a different one of the arms of the bridge adjacent said third terminal, with the anode electrodes of the controlled rectifiers being connected together,
(c) a pair of capacitors each having one terminal connecting to a different one of the first and second terminals of the bridge,
(d) variable resistance means connecting the third terminal of the bridge to the remaining terminals of the pair of capacitors so that the capacitors are charged during alternated half cycles of the source to values related to armature voltage,
(e) a pair of threshold trigger diodes each connecting said remaining terminal of a different one of the capacitors to the gate electrode of a different one of the controlled rectifiers, each diode having a breakdown voltage much less than the peak voltage of the source and exhibiting high impedance until this breakdown is exceeded but thereafter exhibiting a low impedance and a down voltage somewhat less than such breakdown voltage,
(f) a pair of transistors each having its collector-emitter path shunting a different one of the capacitors so that when the transistor is conductive the capacitor will discharge to a value much less than said down voltage during alternate half cycles of the source,
(g) and biasing means responsive to armature current connected separately to the bases of the transistors effective to render the transistors conductive only when the armature current exceeds a preselected maximum.

References Cited in the file of this patent
UNITED STATES PATENTS

| | | |
|---|---|---|
| 3,061,747 | Schlicher | Oct. 30, 1962 |
| 3,095,534 | Cockrell | June 25, 1963 |